(12) United States Patent
Nguyen

(10) Patent No.: US 10,762,611 B2
(45) Date of Patent: Sep. 1, 2020

(54) SCALED TWO-BAND HISTOGRAM PROCESS FOR IMAGE ENHANCEMENT

(71) Applicant: Sensors Unlimited, Inc., Princeton, NJ (US)

(72) Inventor: Thuc-Uyen Nguyen, Princeton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 16/057,280

(22) Filed: Aug. 7, 2018

(65) Prior Publication Data

US 2020/0051224 A1 Feb. 13, 2020

(51) Int. Cl.
*G06T 5/40* (2006.01)
*H04N 5/243* (2006.01)

(52) U.S. Cl.
CPC ............. *G06T 5/40* (2013.01); *H04N 5/243* (2013.01); *G06T 2207/10016* (2013.01)

(58) Field of Classification Search
CPC .. G06T 5/40; G06T 2207/10016; H04N 5/243
See application file for complete search history.

(56) References Cited

U.S. PATENT DOCUMENTS

| 7,003,153 | B1 * | 2/2006 | Kerofsky | G06T 5/009 348/E5.119 |
| 7,755,598 | B2 | 7/2010 | Yang et al. | |
| 7,840,066 | B1 * | 11/2010 | Chen | G06T 5/002 382/168 |

(Continued)

FOREIGN PATENT DOCUMENTS

| CN | 106328037 | 1/2017 |
| KR | 999811 B1 | 12/2010 |

(Continued)

OTHER PUBLICATIONS

Yen-Ching Chang et al., "A Simple Histogram Modification Scheme for Contrast Enhancement", IEEE transaction on Consumer Electronics, IEEE Service Center, NY, NY, vol. 56, No. 2, May 2010, pp. 737-742.

(Continued)

*Primary Examiner* — Amy R Hsu
(74) *Attorney, Agent, or Firm* — Locke Lord LLP; Scott D. Wofsy; Joshua L. Jones

(57) ABSTRACT

A method of image enhancement includes constructing an input histogram corresponding to an input image received at a focal plane array. The method includes performing histogram equalization on a first band of the input histogram starting from a zero value and ending at a division value representing a pixel bin value where a predetermined fraction of the input histogram by pixel hound is reached to produce a first portion of an equalization curve. The method includes performing histogram equalization on a second band of the input histogram starting from the division value and ending at a pixel bin value where all of the input histogram by pixel count is reached to produce a second portion of the equalization curve. The method includes applying the equalization curve to the input image to produce a corresponding enhanced image.

18 Claims, 3 Drawing Sheets

(56) References Cited

U.S. PATENT DOCUMENTS

| | | | |
|---|---|---|---|
| 8,068,436 B2* | 11/2011 | Rui | H04L 43/0882 |
| | | | 370/252 |
| 8,698,961 B2* | 4/2014 | Astrachan | H04N 5/57 |
| | | | 348/672 |
| 9,311,561 B2 | 4/2016 | Hong et al. | |
| 9,774,790 B1* | 9/2017 | Kussel | B60R 1/00 |
| 2003/0161549 A1* | 8/2003 | Lei | G06T 5/009 |
| | | | 382/274 |
| 2008/0042927 A1 | 2/2008 | Jung et al. | |
| 2008/0118176 A1* | 5/2008 | Li | G06T 5/20 |
| | | | 382/274 |
| 2008/0247665 A1* | 10/2008 | Hsu | G06T 5/40 |
| | | | 382/274 |
| 2009/0245689 A1* | 10/2009 | Panetta | G06T 5/40 |
| | | | 382/284 |
| 2015/0213582 A1* | 7/2015 | Kim | G06T 5/008 |
| | | | 382/169 |
| 2015/0294180 A1* | 10/2015 | Hong | G06K 9/4661 |
| | | | 382/168 |
| 2017/0132771 A1* | 5/2017 | Agaian | H04N 1/6027 |

FOREIGN PATENT DOCUMENTS

| | | |
|---|---|---|
| KR | 1462421 B1 | 11/2014 |
| KR | 1516632 B1 | 5/2015 |
| KR | 1726868 B1 | 4/2017 |

OTHER PUBLICATIONS

Qing Wang et al., "Fast Image/Video Contrast Enhancement Based on Weighted Thresholded Histogram Edqualization", IEEE Transaction on Consumer Electronics, IEEE Service Center, NY, NY, vol. 53, No. 2, May 2007, pp. 757-764.

Sapana S Bagade et al., "Use of Histogram Equalization in Image Processing for Image Enhancement", Apr. 2011, Retrieved from the internet: URL: http://citeseerx.ist.psu.edu/viewdoc/download?doi=10.1.1.675.2499&rep=rep1&type=pdf.

Kim Y-T: "Contrast Enhancement Using Brightness Preserving BI-Histogram Equalization", IEEE Transactions on Consumer Electronics, IEEE Service Center, NY, NY, vol. 43, No. 1, Feb. 1997, pp. 1-8.

Singh Kuldeep et al., "Image Enhancement Using Exposure Based Sub Image Histogram Equalization", Pattern Recognition Letters, vol. 36, Sep. 6, 2013, pp. 10-14.

Extended European Search Report dated Nov. 15, 2019, issued during the prosecution of European Patent Application No. EP 19189822.0.

* cited by examiner

SCALED TWO-BAND HISTOGRAM PROCESS FOR IMAGE ENHANCEMENT

BACKGROUND OF THE INVENTION

1. Field of the Invention

The present disclosure relates to imaging systems, and more particularly to image enhancement in imaging systems.

2. Description of Related Art

An image histogram is a graphical and/or conceptual representation of tonal distributions in an image. Pixel data is binned into discrete bins of value distributed along a horizontal axis ranging from the darkest values to the lightest. The vertical height of a given bin represents the number of pixels in the image data that fall into that value bin. Arranging the data in this way graphically allows for quick visual evaluation of the value distribution in an image. Arranging the data in this way conceptually allows for easy manipulation of the data, e.g., to improve the tonal distribution in an image, as in improving contrast or correcting for over or under exposure.

Histogram equalization is a common practice to effectively increase global contrast without losing any image information. But traditional histogram equalization does not preserve the brightness. It also tends to result in saturated-looking images.

The conventional techniques have been considered satisfactory for their intended purpose. However, there is an ever present need for improved image enhancement. This disclosure provides a solution for this need.

SUMMARY OF THE INVENTION

A method of image enhancement includes constructing an input histogram corresponding to an input image received at a focal plane array, the input histogram representing a pixel value distribution corresponding to the input image. The method includes performing histogram equalization on a first band of the input histogram starting from a zero value and ending at a division value representing a pixel bin value where a predetermined fraction of the input histogram by pixel hound is reached to produce a first portion of an equalization curve. The method includes performing histogram equalization on a second band of the input histogram starting from the division value and ending at a pixel bin value where all of the input histogram by pixel count is reached to produce a second portion of the equalization curve. The method includes scaling at least one of the first portion of the equalization curve and/or the second portion of the equalization curve to connect and smooth the first and second portions of the equalization curve at the division value to complete the equalization curve. The method includes applying the equalization curve to the input image to produce a corresponding enhanced image.

The division value can be at a pixel bin value where half of the input histogram by pixel count is reached. The method can include generating a stream of enhanced video data wherein the video data includes a series of images, wherein constructing an input histogram, performing histogram equalization on the first band, performing histogram equalization on the second band, scaling, and applying the equalization curve are repeated for each image in the series of images. The division value can be at a pixel bin value where half of the respective input histogram by pixel count is reached for each respective image in the series of images. Parameters for performing histogram equalization and scaling can be constant for the series of images. Constructing an input histogram, performing histogram equalization on the first band, performing histogram equalization on the second band, and scaling can be repeated in real-time for real-time enhancement of each image in the series of images.

Constructing an input histogram, performing histogram equalization on the first band, performing histogram equalization on the second band, and scaling can be automated and repeated for every image received at the focal plane array, e.g., wherein parameters for performing histogram equalization and scaling are held constant for all input images received at a focal plane array.

The enhanced histogram can have a different mean value from that of the input histogram. Performing histogram equalization on the first band can includes using a cumulative distribution function for the first band, wherein the cumulative distribution function is normalized over the input histogram, and wherein performing histogram equalization on the second band includes starting a new cumulative distribution function at the division value, wherein the new cumulative distribution function is normalized over only the second band of the input histogram.

An imaging system includes optics optically coupled to a focal plane array configured to receive images focused thereon by the optics. A controller is operatively connected to the focal plane array, wherein the controller includes machine readable instructions configured to cause the controller to perform any of the methods disclosed above or herein.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
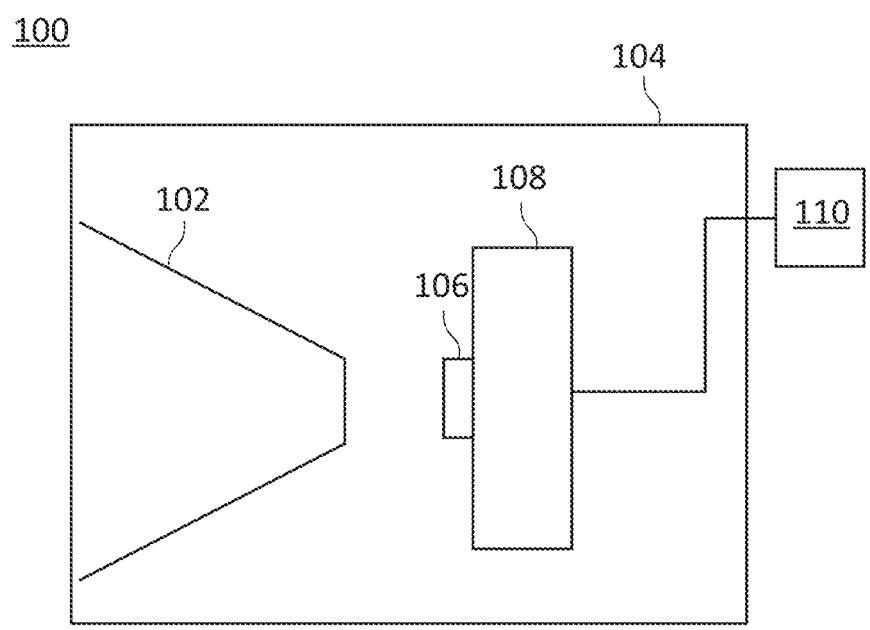
FIG. 1 is a schematic view of an exemplary embodiment of an imaging system constructed in accordance with the present disclosure, showing the focal plane array (FPA) and the controller.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-3, as will be described. The systems and methods described herein can be used to improve image and video quality in real-time enhancement.

The imaging system 100, e.g., a camera system, includes optics 102, e.g., including one or more lens elements, optically coupled within a housing 104 to a focal plane array 106 configured to receive images focused thereon by the optics 102. A controller 108 is operatively connected to the focal plane array 106, wherein the controller includes machine readable instructions configured to cause the controller to perform any of the methods described herein. The controller 108 is connected to an output interface 110 for outputting images, e.g. for display, print, storage, or the like.

Figure 2:
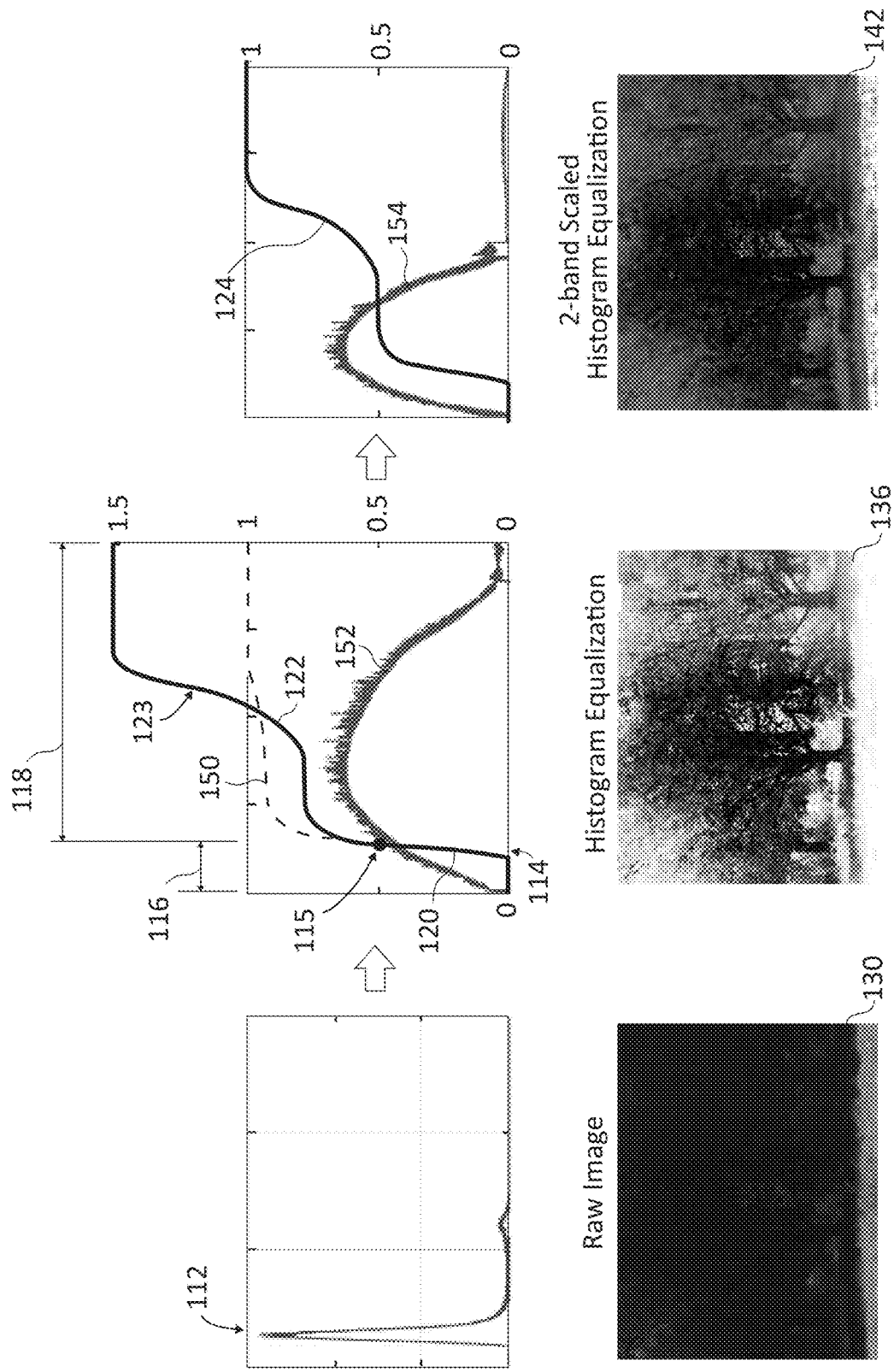
FIG. 2 is a schematic view of the an exemplary histogram manipulation for the system of FIG. 1, showing a process for enhancing the input histogram.

With reference now to FIG. 2, a method of image enhancement includes constructing an input histogram 112 corresponding to an input or raw image 130 received at the focal plane array 106 of FIG. 1. The input histogram 112 represents a pixel value distribution corresponding to the input image 130. The method includes performing histogram equalization on a first band 116 of the input histogram starting from a zero value bin (the left end of the horizontal axis of in FIG. 2) and ending a division value 114 on the horizontal axis representing a pixel bin value where a predetermined fraction of the input histogram by pixel count is reached to produce a first portion 120 of an equalization curve 123. The method also includes performing histogram equalization on the second band 118 of the histogram starting from the division value 114 and ending at a pixel bin value where all of the input histogram by pixel count is reached to produce a second portion 122 of the equalization curve 123 (e.g. on the right end of the horizontal axis in FIG. 2).

Performing histogram equalization on the first band 116 can include using a cumulative distribution function for the first band 116 wherein the cumulative distribution function (CDF) is normalized over the entire input histogram 112 (e.g. if the input image has 20 megapixels, the CDF is normalized over 20 megapixels). In this example, the division value 114 is at 50% or 0.5 on the vertical axis in FIG. 2, where half of the pixels are in the first band 118. Performing histogram equalization on the second band 118 includes starting a new CDF at the division value 114, wherein the new CDF is normalized over only the second band 118 of the input histogram 112 (e.g., if the input image has 20 megapixels and the division value 114 is 50% then the new CDF is normalized over only 10 megapixels). The result is that with the first and second portions 120 and 122 of the equalization curve joined, the pre-scaled equalization curve 123 reaches over 100%, in the example in FIG. 2, it reaches a value of 150% or normalized value of 1.5 on the vertical scale.

The method includes scaling at least one of the first portion 120 and/or the second portion 122 of the equalization curve to connect and smooth the first and second portions 120 and 122 of the equalization curve at the division value 114 to complete the final equalization curve 124, which is scaled back down to have a maximum value of 100%. In this example, the first and second portions 120 and 122 of the equalization curve 123 are joined at point 115 (corresponding to the division value 114) in FIG. 2, and are scaled down together to produce the final equalization curve 124 in FIG. 2. The method includes applying the final equalization curve 124 to the input image to produce a corresponding enhanced image (e.g., images 138, 140, and 142 in FIG. 3). FIG. 2 also shows in broken lines the ordinary CDF curve 150 and the histogram equalization histogram 152 obtained by applying the curve 150 to the input image 130. The resulting output image is histogram equalized image 136. By comparison, the final equalization curve 124 is applied to the raw image 130 to obtain the enhanced histogram 154 corresponding to the enhanced image 142. Images 130, 136, and 142 are further compared below with reference to FIG. 3.

The division value 114 is at the pixel bin value where half of the input histogram by pixel count is reached by the CDF. Those skilled in the art will readily appreciate that any predetermined pixel bin value can be used for the division value, e.g., 25% of the pixels, 75% of the pixels, or the like, without departing from the scope of this disclosure.

The method includes generating a stream of enhanced video data wherein the video data includes a series of images, wherein constructing an input histogram 112, performing histogram equalization on the first band 116, performing histogram equalization on the second band 118, scaling, and applying the enhanced equalization curve 124 to produce an enhanced image are repeated for each image in the series of images. The division value 114 can always be where half of the input histogram by pixel count is reached by the CDF for each respective image in the series of images. Other parameters for performing histogram equalization and scaling can also be held constant for the series of images. Constructing an input histogram 112, performing histogram equalization on the first band 116, performing histogram equalization on the second band 118, and scaling can be repeated in real-time for real-time enhancement of each image in the series of images. In other words, video captured by the imaging system 100 can be enhanced with these methods in real-time, e.g., so a user viewing the video on a display sees the enhanced imagery in real time as the video is captured.

Similarly in the context of still image photography, constructing the input histogram 112, performing histogram equalization on the first band 116, performing histogram equalization on the second band 118, and scaling are automated and repeated for every image received at the focal plane array 106 of FIG. 1, wherein parameters for performing histogram equalization and scaling are held constant for all input images received at a focal plane array 106. Whether used for still photography or video capture, the systems and methods disclosed herein can provide for automated image enhancement in real-time.

The resulting enhanced histogram 154 for a given image has a different mean value from that of the input histogram 112 for the input image since the processes outlined above do not force the average to be maintained. This allows for improved low-light performance relative to if the mean value were maintained to produce an enhanced histogram.

Figure 3:
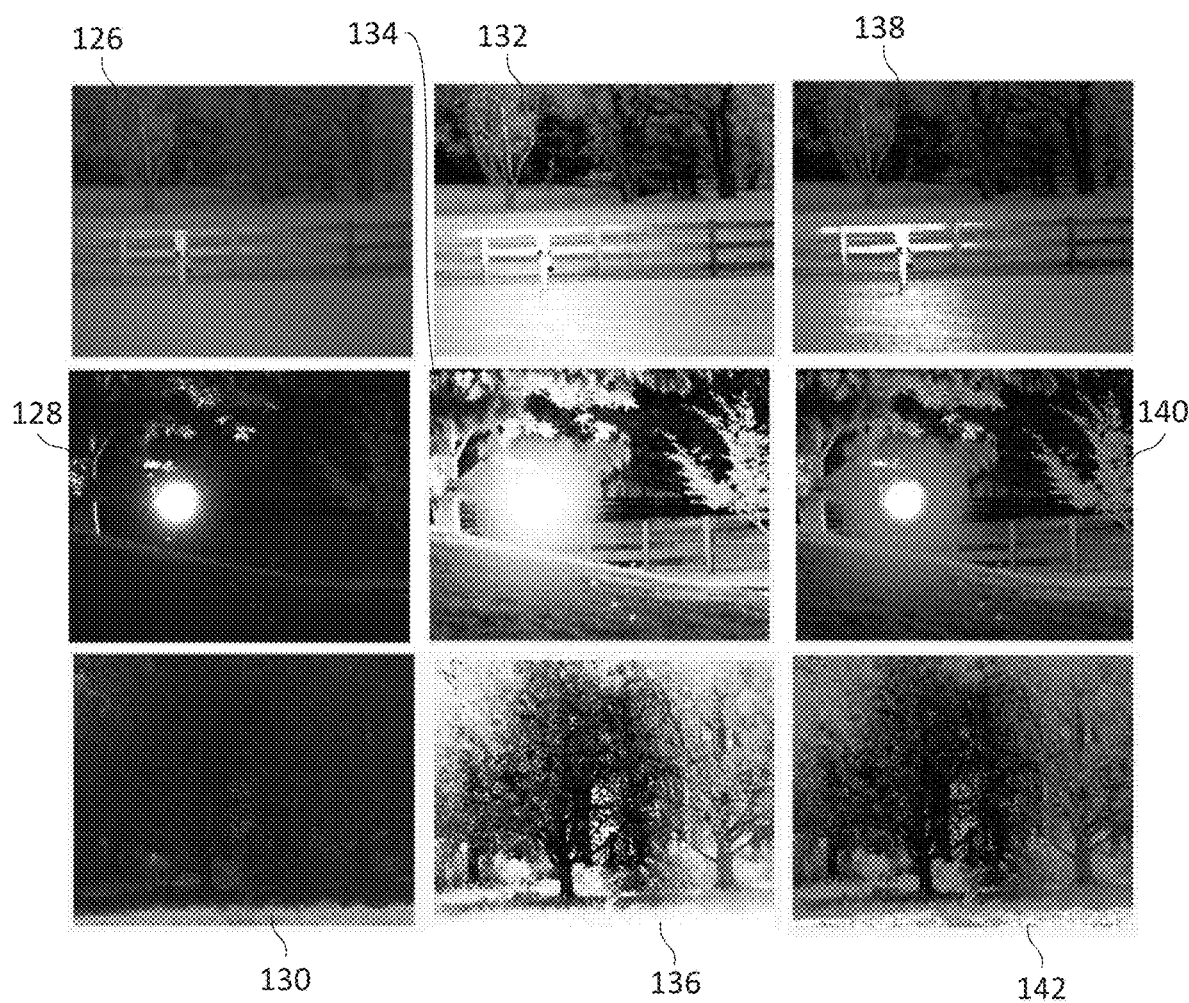
FIG. 3 is a diagram showing three raw images in the first column, the three images corrected by traditional histogram equalization in the middle column, and the three images corrected using systems and methods as disclosed herein in the third column.

With reference now to FIG. 3, three raw images 126, 128, and 130 are shown in the first column. These three images 126, 128, and 130 are corrected by traditional histogram equalization to produce the three respective images 132, 134, and 136 in the middle column. The three images 126, 128, and 130 are also corrected using systems and methods as disclosed herein to produce the three respective enhanced images 138, 140, and 142 in the third column of FIG. 3. For the first image 126, the traditional histogram equalization results in blown out or saturated bright values in the foreground of image 132, whereas in the enhanced image 138 in accordance with the techniques disclosed herein, the foreground is much less blown out or saturated, preserving detail while improving contrast in the dark values. Similarly, for the image 128, the traditional histogram equalization used to produce image 134 blows out a large area surrounding the light source, whereas the enhanced image 140 in accordance with this disclosure improves visibility in the dark areas, e.g., making the tree on the right of image 140 visible, without blowing out the area around the light source. Similarly, for image 130, the grass in the foreground is blown out in the image 136 produced by traditional histogram equalization, whereas the enhanced image 142 in accordance with the present disclosure provides enhanced visibility of detail in the dark background without as much blowing out in the grass in the foreground.

While shown and described in the exemplary context of grayscale images, those skilled in the art will readily appreciate that systems and methods as disclosed herein can be applied to color and/or multi-band images (e.g., including different infrared bands) without departing from the scope of this disclosure.

The methods and systems of the present disclosure, as described above and shown in the drawings, provide for enhancing images with superior properties including improved image and video quality in real-time enhancement relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of image enhancement comprising:
   constructing an input histogram corresponding to an input image received at a focal plane array, the input histogram representing a pixel value distribution corresponding to the input image;
   performing histogram equalization on a first band of the input histogram starting from a zero value and ending at a division value representing a pixel bin value where a predetermined fraction of the input histogram by pixel count is reached to produce a first portion of an equalization curve;
   performing histogram equalization on a second band of the input histogram starting from a pixel value at the division value and ending at a pixel bin value where all of the input histogram by pixel count is reached to produce a second portion of the equalization curve, wherein performing the histogram equalization on the second band includes starting counting of pixels in the second band at a pixel count of zero; and
   scaling at least one of the first portion of the equalization curve and/or the second portion of the equalization curve to connect and smooth the first and second portions of the equalization curve at the division value to complete the equalization curve; and
   applying the equalization curve to the input image to produce a corresponding enhanced image.

2. The method as recited in claim 1, wherein the division value is at a pixel bin value where half of the input histogram by pixel count is reached.

3. The method as recited in claim 2, further comprising generating a stream of enhanced video data wherein the video data includes a series of images, wherein constructing an input histogram, performing histogram equalization on the first band, performing histogram equalization on the second band, scaling, and applying the enhanced equalization curve are repeated for each image in the series of images.

4. The method as recited in claim 3, wherein the division value is at a pixel bin value where half of the respective input histogram by pixel count is reached for each respective image in the series of images.

5. The method as recited in claim 3, wherein parameters for performing histogram equalization and scaling are constant for the series of images.

6. The method as recited in claim 3, wherein constructing an input histogram, performing histogram equalization on the first band, performing histogram equalization on the second band, and scaling are repeated in real-time for real-time enhancement of each image in the series of images.

7. The method as recited in claim 1, wherein constructing an input histogram, performing histogram equalization on the first band, performing histogram equalization on the second band, and scaling are automated and repeated for every image received at the focal plane array, wherein parameters for performing histogram equalization and scaling are held constant for all input images received at a focal plane array.

8. The method as recited in claim 1, wherein the enhanced histogram has a different mean value from that of the input histogram.

9. The method as recited in claim 1, wherein performing histogram equalization on the first band includes using a cumulative distribution function for the first band, wherein the cumulative distribution function is normalized over the input histogram, and wherein performing histogram equalization on the second band includes starting a new cumulative distribution function at the division value, wherein the new cumulative distribution function is normalized over only the second band of the input histogram.

10. An imaging system comprising:
    optics optically coupled to a focal plane array configured to receive images focused thereon by the optics; and
    a controller operatively connected to the focal plane array, wherein the controller includes machine readable instructions configured to cause the controller to:
       construct an input histogram corresponding to an input image received at a focal plane array, the input histogram representing a pixel value distribution corresponding to the input image;
       perform histogram equalization on a first band of the input histogram starting from a zero value and ending at a division value representing a pixel bin value where a predetermined fraction of the input histogram by pixel count is reached to produce a first portion of an equalization curve;
       perform histogram equalization on a second band of the input histogram starting from a pixel value at the division value and ending at a pixel bin value where all of the input histogram by pixel count is reached to produce a second portion of the equalization curve, wherein performing the histogram equalization on the second band includes starting counting of pixels in the second band at a pixel count of zero;
       scale at least one of the first portion of the equalization curve and/or the second portion of the equalization curve to connect and smooth the first and second portions of the equalization curve at the division value to complete the equalization curve; and
       apply the equalization curve to the input image to produce a corresponding enhanced image.

11. The system as recited in claim 10, wherein the division value is at a pixel bin value where half of the input histogram by pixel count is reached.

12. The system as recited in claim 11, wherein the machine readable instructions are configured to cause the controller to generate a stream of enhanced video data wherein the video data includes a series of images, wherein constructing an input histogram performing histogram equalization on the first band, performing histogram equalization on the second band, scaling, and applying the enhanced equalization curve are repeated for each image in the series of images.

13. The system as recited in claim 12, wherein the division value is at a pixel value where half of the respective input histogram by pixel count is reached for each respective image in the series of images.

14. The system as recited in claim 12, wherein parameters for performing histogram equalization and scaling are constant for the series of images.

15. The system as recited in claim 12, wherein constructing an input histogram, performing histogram equalization on the first band, performing histogram equalization on the second band, and scaling are repeated in real-time for real-time enhancement of each image in the series of images.

16. The system as recited in claim 10, wherein constructing an input histogram, performing histogram equalization on the first band, performing histogram equalization on the second band, and scaling are automated and repeated for every image received at the focal plane array, wherein parameters for performing histogram equalization and scaling are held constant for all input images received at the focal plane array.

17. The system as recited in claim 10, wherein the enhanced histogram has a different mean value from that of the input histogram.

18. The system as recited in claim 10, wherein performing histogram equalization on the first band using a cumulative distribution function for the first band, wherein the cumulative distribution function is normalized over the input histogram, and wherein performing histogram equalization on the second band includes starting a new cumulative distribution function at the division value, wherein the new cumulative distribution function is normalized over only the second band of the input histogram.

* * * * *